Feb. 10, 1931.          J. W. BRYCE                1,791,950
                    CARD PUNCHING DEVICE
                    Filed Oct. 19, 1925      8 Sheets-Sheet 2

Fig. 2.

Inventor
James W. Bryce
By his Attorneys
Cooper, Kerr & Dunham.

Feb. 10, 1931.  J. W. BRYCE  1,791,950
CARD PUNCHING DEVICE
Filed Oct. 19, 1925  8 Sheets-Sheet 3

Feb. 10, 1931.  J. W. BRYCE  1,791,950
CARD PUNCHING DEVICE
Filed Oct. 19, 1925   8 Sheets-Sheet 7

Inventor
James W. Bryce
By his Attorneys
Cooper, Kerr + Dunham

Feb. 10, 1931.       J. W. BRYCE       1,791,950
CARD PUNCHING DEVICE
Filed Oct. 19, 1925     8 Sheets-Sheet 8

Inventor
James W. Bryce
By his Attorneys
Cooper, Kerr & Dunham

Patented Feb. 10, 1931

1,791,950

UNITED STATES PATENT OFFICE

JAMES W. BRYCE, OF BLOOMFIELD, NEW JERSEY, ASSIGNOR TO THE TABULATING MACHINE COMPANY, OF ENDICOTT, NEW YORK, A CORPORATION OF NEW JERSEY

CARD-PUNCHING DEVICE

Application filed October 19, 1925. Serial No. 63,242.

This invention pertains to a machine for punching record cards such as are used in tabulating machines, particularly machines of the kind that duplicate in one punching operation all desired perforations of a card already punched.

In the tabulating art it is frequently necessary to provide one or more duplicate copies of an original card. The original card is usually punched one hole at a time by an operator with a key operated machine, but as it would be too slow and expensive a process to punch duplicates of the originals by hand, gang punch machines have been designed that reproduce as much as desired of the original or pattern card in a single operation.

Most machines of that class are designed to punch a number of duplicate cards from a pattern card which is placed in position by the operator and remains in the machine until the required number of duplicates are prepared.

It often happens that instead of requiring a number of duplicates of a single card the operator wants a single duplicate of each of a number of cards which would be impractical in the above described machine because a pattern card would have to be manually removed and another one inserted for each duplicate card punched.

My present invention discloses an improved duplicating gang punch of a type especially suited for the above described work, viz, punching automatically a single duplicate of each of a number of pattern cards.

Another object of my invention is to provide means permitting the operator to duplicate the perforations from only a selected field or fields on the pattern card, leaving unpunched the other fields of the duplicate card.

In some kinds of accounting information is accumulated gradually over a period of time on cards in use and only the latest entries are of interest, so when a new period of time is entered, or for any reason a new card is necessary, it is desired to duplicate on the new card only the latest entries on the old card and those entries must be in a new location, say, at the left of the new card, whereas they were at the right on the old card, and one important object of my present invention is to provide means for making such transpositions. By this machine any column in any position on the pattern card may be duplicated at any predetermined position or positions on the new card.

Another object is to provide a machine of this type in which the selection of the duplicating punches is electrically instead of mechanically controlled by the pattern card.

The machine comprises in general the analyzing section 20, the punching section 22, and the plugboard 24.

The pattern cards are fed one by one from magazine 26 by picker 28, carried through the analyzing section and deposited on the discharge stack 30.

While the pattern card is passing through section 20 it controls, through circuits set up on plugboard 24, the selection of punches, in the punching section 22, which operate on a blank card fed from magazine 32 all as will be explained in detail.

Power for the entire machine is furnished by motor 34 through belt 36 to pulley 38 on shaft 40. Associated with pulley 38 is the usual tabulator clutch 42 (Fig. 10) controlled by clutch magnet 44, shown diagrammatically in Fig. 12. Pinion 46 on the end of shaft 40 through idler gear 48 drives shaft 50 of the punching section by means of gear 52 which is twice the diameter of pinion 46, thus turning shaft 50 one revolution for each two revolutions of shaft 40.

Figures 9, 10, 11:
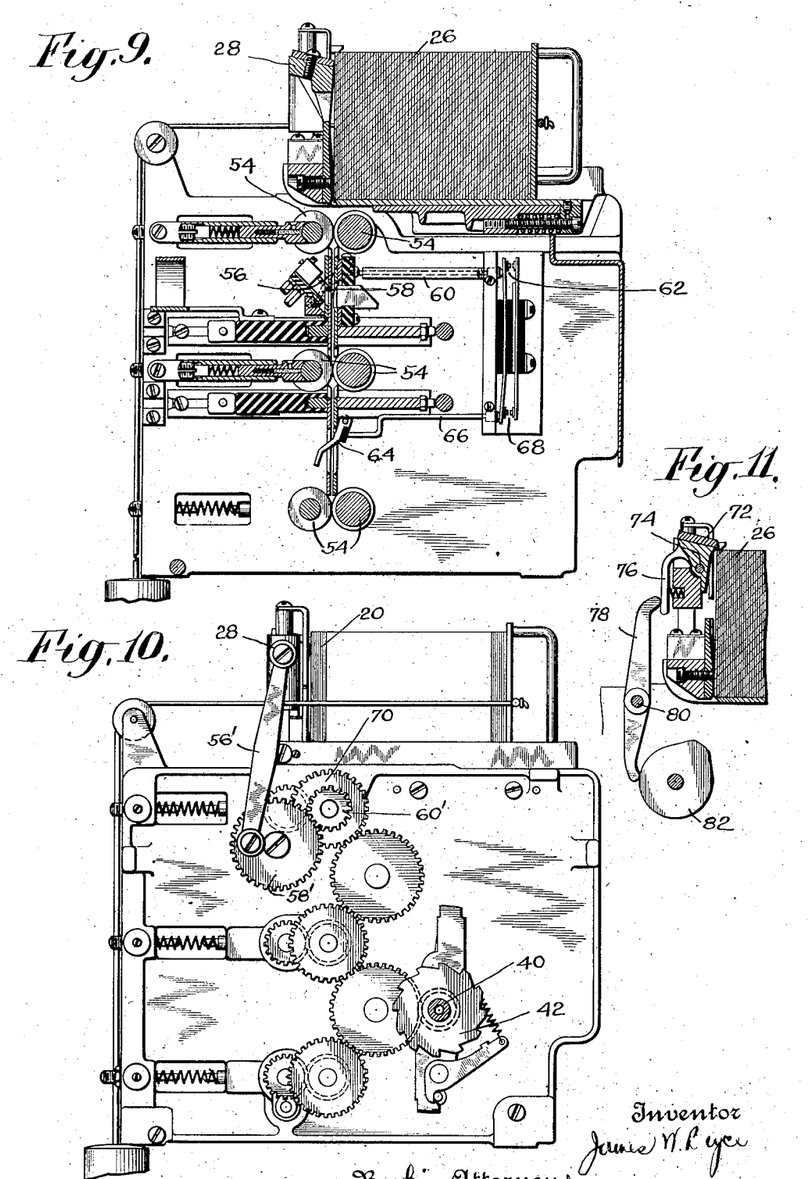
Fig. 9 is a sectional view showing the magazine, feeding and contact devices for the pattern cards.
Fig. 10 is an outside view of Fig. 9.
Fig. 11 is a detail showing a modification of the picker device for feeding pattern cards.

The analyzing section is provided with three pairs of feed rolls 54 driven as is customary in machines of this kind by a train of gears from shaft 40 (Figs. 9 and 10). Picker device 28 is reciprocated by a link 56' connected to a crank pin on gear 58' driven by pinion 60', gear 58' making one revolution for each cycle of operation of the punching section. Pattern cards from magazine 26 are fed downwardly one at a time by picker 28 and feed rolls 54 past analyzing brushes 56 there being one brush for each card column. While passing between the first and second pairs of feed rolls the card actuates the upper card lever 58 which through rod 60 closes contact 62, and while passing between the second and third pairs of feed rolls the card actuates lower card lever 64 which by means of its push rod 66 closes contact 68. These features are shown diagrammatically in Fig. 12. The lower contact 68 is provided in this machine in order that the operating circuit may be kept closed while the punching section is performing its functions.

While the card is passing from the first to second pair of feed rolls the brushes make contacts through the perforations and the electric circuits thereby formed act to control the setting of the punches in the punch section, as will be explained. While the card is passing between the second and third pairs of rolls the punching device is actuated to perform the punching operation. The cards do not follow each other through the analyzing section at close intervals as in regular tabulating operations, but on account of the two to one ratio of gears 58' and 60' a card is fed at intervals corresponding to every second cycle of the regular tabulating or sorter feed and the cards are therefore two card cycles apart instead of only one, hence the necessity for the extra card lever 64 and its contact 68.

Fig. 11 shows an alternate method of operating the picker device to feed a card every second cycle. Link 56' may be connected directly to gear 70 and consequently reciprocate the picker once each normal card cycle instead of once for every second card cycle. Picker 72 is pivoted at 74 and has a downwardly extending finger 76 against which bears the upper end of lever 78, pivoted at 80. The lower end of lever 78 bears on cam 82 which is on the same shaft as gear 58' and therefore makes a half revolution each card cycle. During one half revolution the concentric part of the cam is in contact with lever 78 as in Fig. 11 and picker 72 is permitted to engage and feed a card. During the other half revolution of cam 82 the high part of the cam causes lever 78 to press finger 76 to the right holding picker 72 to the left so it fails to engage a card and there is a vacant card cycle, thus allowing the punching device sufficient time to perform its functions.

The punching section of the present invention is an improvement on the mechanically controlled duplicating gang punch disclosed in copending application, Serial No. 63,830, filed October 21, 1925, of C. D. Lake and R. E. Page. I shall fully describe here the electric control features of my present machine which are new, but only such features of the mechanical punch mechanism as are essential to an understanding of the present invention.

Figure 2:
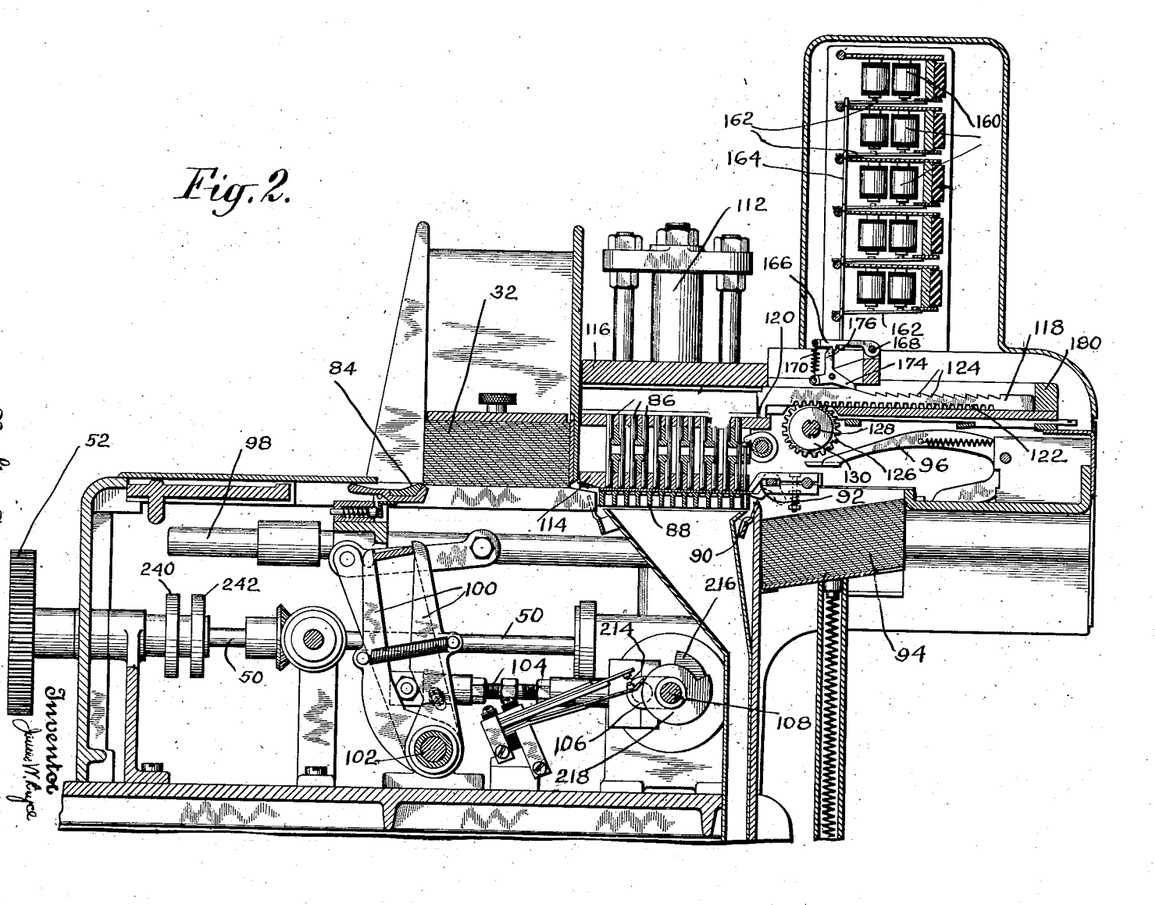
Fig. 2 is a longitudinal section through the middle of the punching section of the machine.
Figure 4:
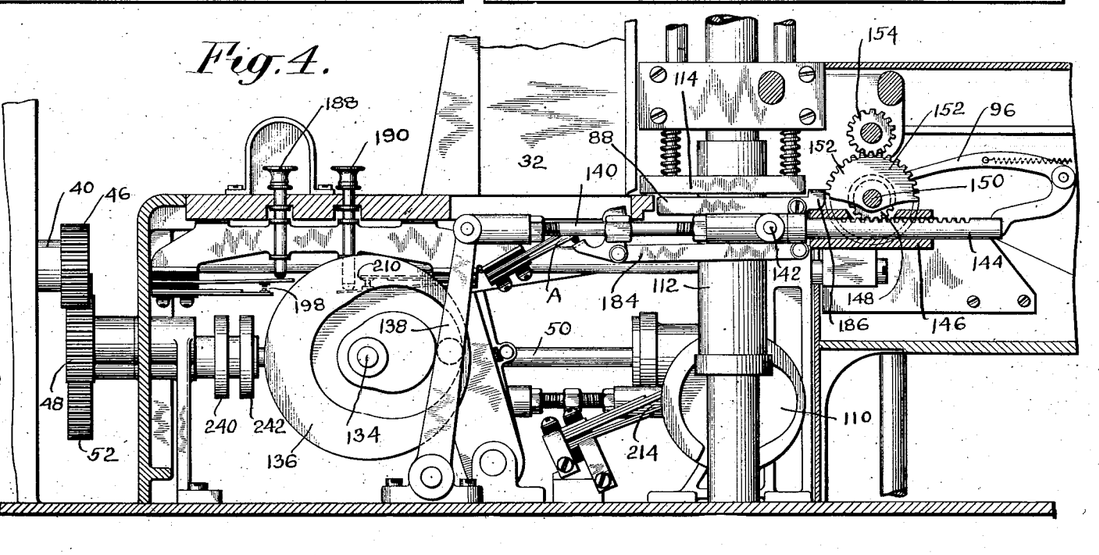
Fig. 4 is a longitudinal sectional view of the punching section of the machine taken just inside the front case.
Figure 7:
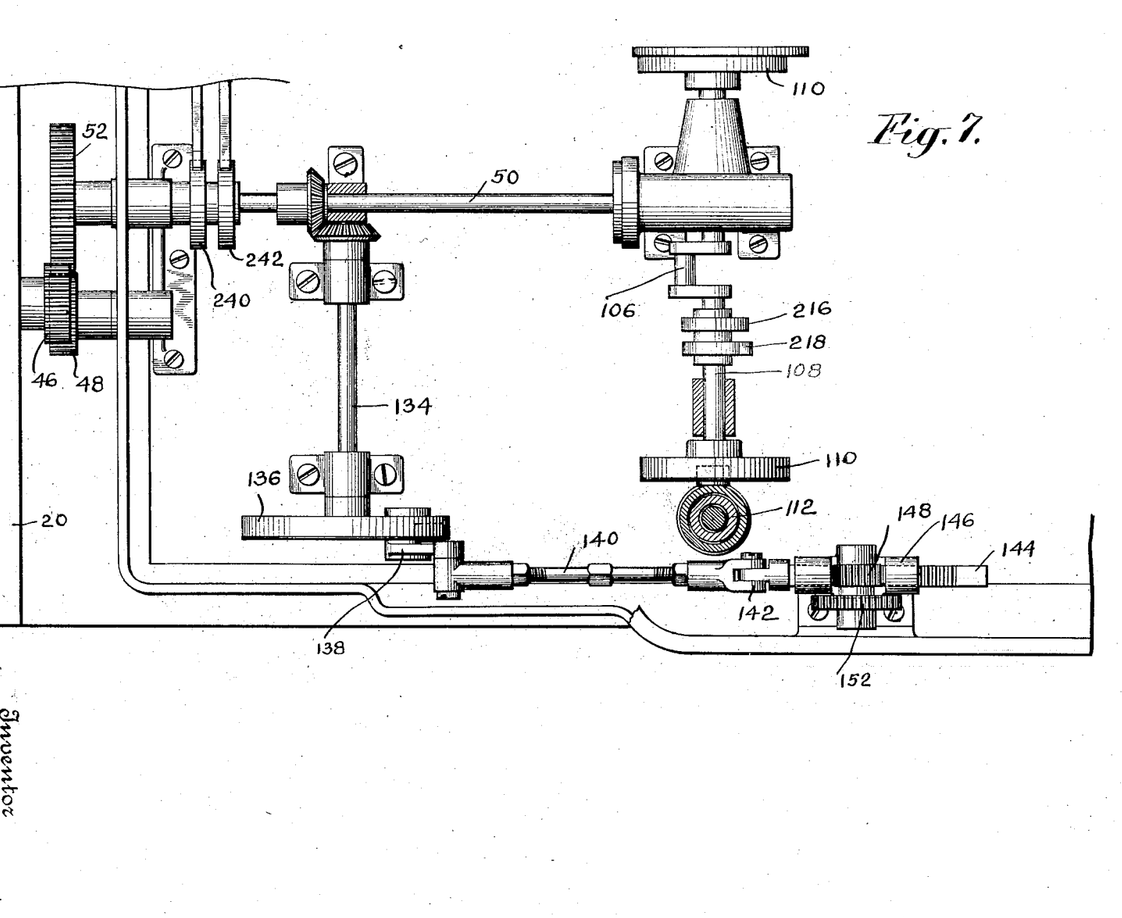
Fig. 7 is a plan view of the various drive shafts in the punching section of the machine.

A general understanding of the operation of the punching section may be obtained from Figs. 2, 4 and 7. The blank cards are placed in magazine 32 and are fed therefrom one at a time by picker 84 to a position under the punches 86, where the card is accurately positioned on die plate 88 by fingers 90. The card is then punched, as will be explained, and is then seized by gripper device 92 by which it is removed to a position above discharge stack 94 when it is impelled by arm 96 onto the stack. Picker 84 and gripper 92 are moved back and forth in unison, both being fast to horizontal parallel rods 98 which are reciprocated by rocking arms 100 pivoted at 102 and actuated through connecting rod 104 by crank 106 on cross shaft 108, which is driven by worm gears from shaft 50.

On the ends of shaft 108 are box cams 110, which effect the punching operation by reciprocating vertically the sleeves 112 that carry the die plate 88 and guide plate 114 with the card between them. All punches ride freely upwards on the top of the card except those punches prevented from rising by the interposer or selector bars positioned above them. The method of positioning the selector bars will now be explained.

Figure 3:
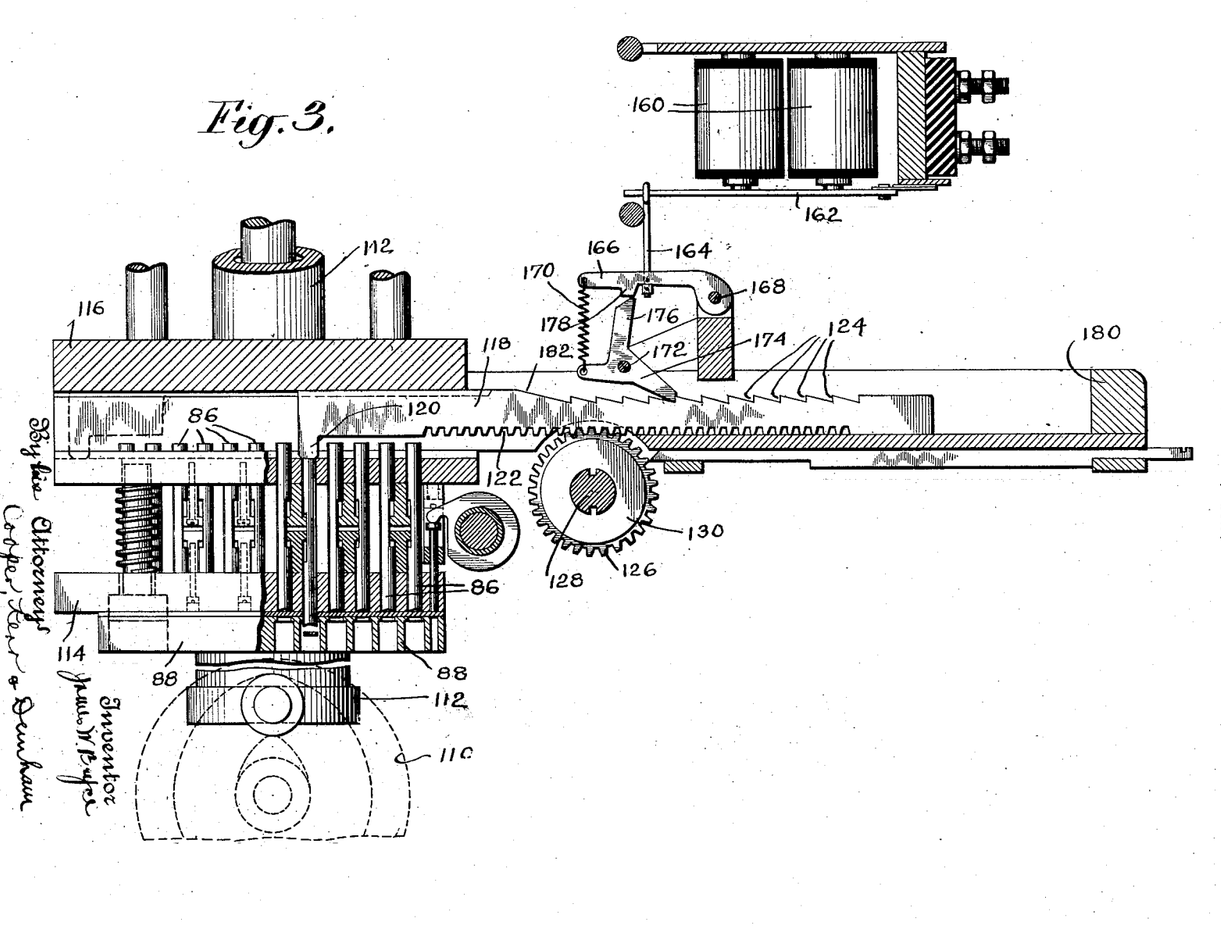
Fig. 3 is an enlarged detail sectional view of the punching device.

The punches 86 are arranged in forty-five rows of twelve punches each, so spaced that when a record card is on the die plate 88 one punch will rest on each card index position of the card including the two extra positions *x* and *xx* sometimes used above the zero position. Each row of twelve punches corresponds to a card in column. Above the punches and spaced from them is a fixed plate 116 (Figs. 2 and 3). Arranged to travel above the punches and beneath plate 116 are forty-five selector bars 118, there being one bar for each card column. Each selector bar has a downwardly projecting lug 120 and the function of the punch control devices is to position lugs 120 above the punches that are to be made effective.

In Fig. 3 it will be seen that lug 120 is above the fifth punch from the right. Die plate 88 has been raised by cams 110 and all the punches were raised by the card except the fifth punch which, being held down by its selector bar, was forced through the card, punching a hole at the index position covered by that particular punch.

Each selector bar has rack teeth 122 cut on its bottom edge and 12 ratchet teeth 124 in its upper edge, one ratchet tooth for each punch. In mesh with each rack is a gear 126 free to turn on shaft 128 but pinched between two friction discs 130 fast to shaft 128 and compressed longitudinally of the shaft by spring 132 so when shaft 128 is turned each gear 126 turns with it, friction driven, until the selector bar with which it is meshed is stopped by an outside agency, whereupon the gear is also stopped being held by its bar in spite of the driving effect of its friction washers.

Mounted on the end of shaft 134 driven by bevel gears from shaft 50 is a box cam 136 (Figs. 4 and 7) that makes one revolution for each cycle of operations of the punch section. Attached to the upper end of arm 138, actuated by cam 136, is the link 140, connected at 142 to rod 144 which is guided for reciprocation in bearing 146. Rod 144 has rack teeth on its upper side in mesh with gear 148 fast on shaft 150, which has also fast to it gear 152 which in turn meshes with gear 154 which drives shaft 128 through the instrumentality of sleeve 156. It will be evident that, connected as above, when rack bar 144 moves to the right the selector bars will also move to the right and when bar 144 moves to the left the selector bars will also move to the left.

During one portion of the cycle of operations of the punch section, both cams 110 and 136 are inactive, rack rod 144 being held at the right hand end of its stroke by the outer concentric portion of cam 136 while cam 110 allows die plate 88 to remain inactive in its lowered position. This portion of the cycle is utilized to move rods 98 to the right thereby removing the previously punched card from the dies and feeding a new card into position to be punched.

During the next portion of the cycle cam 136 draws all selector bars to the left, each bar passing above the top of its corresponding row of punches.

If there is a perforation in the column traversed by a selector bar the bar is stopped with its lug 120 over the appropriate punch, but any bar that meets no interference passes clear across the punches stopping in the position indicated by the dotted lines at the left in Fig. 3 and no hole will be punched in the card column corresponding to that row of punches.

Figure 8:
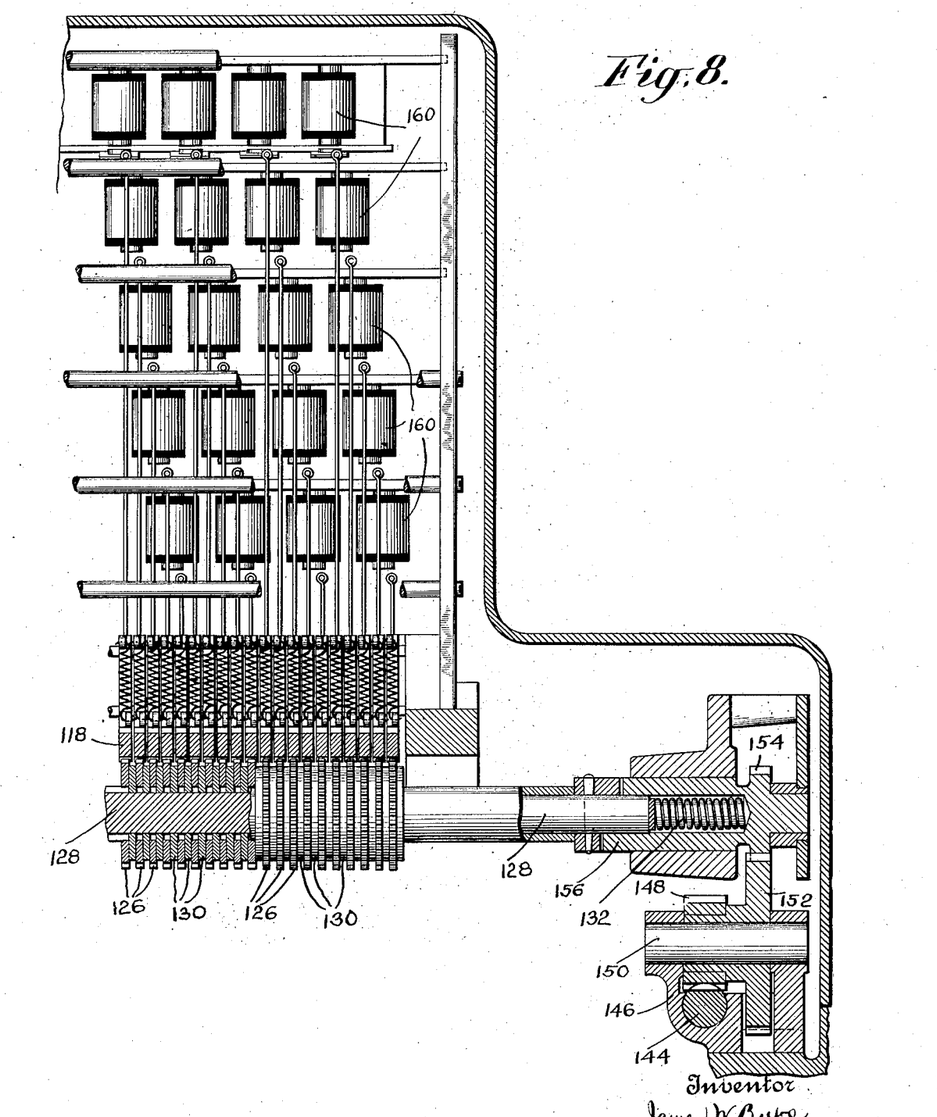
Fig. 8 is an enlarged detail view showing magnets for controlling the interposer bars and gears for operating the bars.

The selector bars having been set during the above part of the cycle the next portion of the cycle is now carried out during which the die plate is raised and retracted again by cam 110, thus punching the card and leaving it free to be removed by grippers 92. Coordinated with each selector bar and located above it is a magnet 160, the forty-five magnets being arranged for convenience in banks as shown in Fig. 8. Each magnet has an armature 162 and depending from the end of each armature is a link 164 supporting at its lower end a latch arm 166 pivoted at 168 and drawn downwardly by spring 170. Pivoted on the frame at 172 is a dog 174 arranged when unlatched to engage a tooth 124 of its corresponding selector bar. Pawl 174 has an upstanding arm 176 which is normally latched on the left side of projection 178 on the lower edge of arm 166, in which position 174 is out of engagement with teeth 124. Pawl 174 is urged in clockwise direction by spring 170 which ties 174 and 166 together. Each magnet 160 is wired to a brush 56 traversing a card column and the magnet is controlled by the perforation in that particular column. The cards are fed past the brushes bottom first and the index positions pass the brushes in the order 9, 8, 7, 6, 5, 4, 3, 2, 1, 0, x, xx. The movement of the selector bars to the left is synchronized with the passage of the card past the brushes so that lug 120 is over the punch corresponding to each index position at the same time the brush is in contact with that same index position on the card. If at that position the brush finds a hole in the card a circuit is formed through the hole resulting in the magnet 160 coordinated to that column being energized, its armature actuated, its latch arm 166 drawn up, and its dog 174 released. Dog 174 thereupon drops into a notch 124 in its selector bar stopping the bar with its lug 120 above the punch corresponding to the hole in the card (Fig. 3). This movement of the selector bars to the left completes the first portion of the punching cycle with a selector bar in each column in position to hold down the punch corresponding to the hole found by the brush in the card column to which that selector bar is coordinated. With the selector bars in that position the second portion of the cycle takes place in which cam 110 raises and retracts the die plate thus effecting the punching operation and producing a card in which is reproduced all desired information from the pattern card.

The third portion of the cycle now takes place, the selector bars being retracted to their home positions with their right ends against frame member 180. In this position the high portion 182 of the selector bar is under dog 174, thus carrying its upstanding arm 176 to the left of shoulder 178, arm 166 being then in lowered position as its magnet is deenergized. During this portion of the cycle the punched card is removed to the discharge stack by grippers 92 and a blank card is fed into punching position by picker 84, thus completing the cycle of operations of the punching section.

There is provided a pair of contacts A (Fig. 4) designed to be opened automatically through the agency of link 184 and pivoted member 186 whenever the supply of cards is exhausted thereby stopping the machine, as is fully explained in the copending application already referred to.

Figure 12:
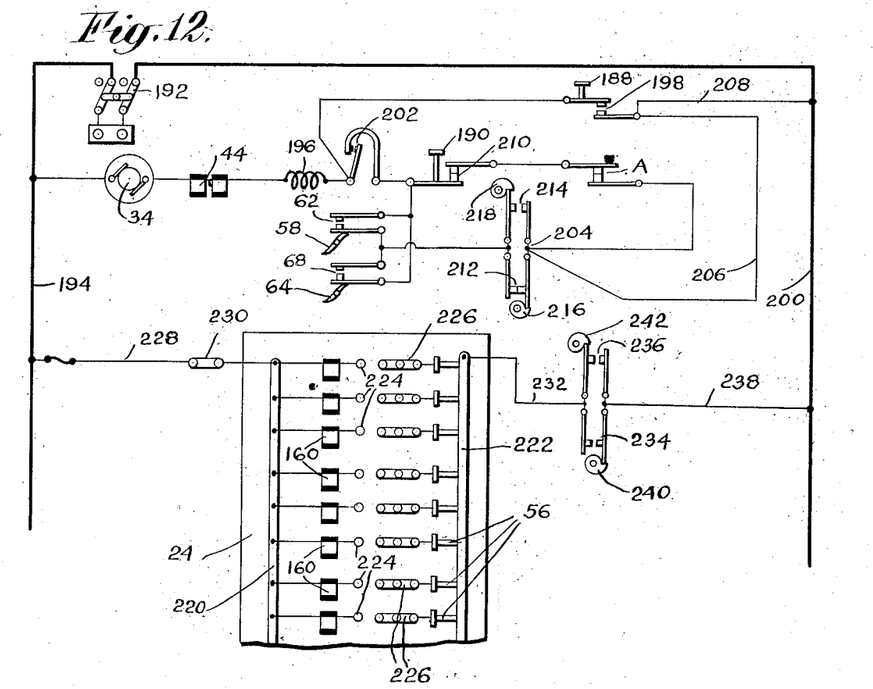
Fig. 12 is a wiring diagram of the machine.

With the above described mechanical construction in mind the electrical features of the machine may be fully understood by reference to the circuit diagram in Fig. 12.

The machine is started in operation by depressing start key 188 and stopped manually by depressing stop key 190 (Figs. 4 and 12). Current is supplied from the outside source through switch 192 and when start key 188 is depressed current flows from left side of line 194 through motor 34, clutch magnet 44, relay coil 196, contact 198 to right side of line 200. The energization of coil 196 closes contact 202 and a stick circuit is established through motor 34, magnet 44, coil 196, contact 202, and thence by two paths to binding post 204 and to line 200 by way of lines 206 and 208. One path is through contact 210 and machine controlled contact "A," while the other is through card lever contacts 62, 68 and the conventional make and break contacts 212 and 214. The timing of these contacts is such that "A" makes before 214 breaks and holds contact for a brief interval after 212 makes. This means that when "A" is held open by the automatic action of the machine, both "A" and the cam contacts will be open and the machine will stop at a position between the breaking of 214 and the making of 212. The same is true if the machine be stopped manually by depressing stop key 190 and opening contact 210. The machine will likewise stop, as previously explained, if both card lever contacts 62 and 68 are open.

Contacts 212 and 214 are actuated by cams 216 and 218 respectively mounted on shaft 108 (Figs. 2 and 7).

Switchboard 24 is provided with common bars 220 and 222, bar 220 being connected to a series of plug sockets 224 through the individual magnets 160. On the other side of the board common bar 222 is shown connected through brushes 56 to multiple plug sockets 226.

Figure 5:
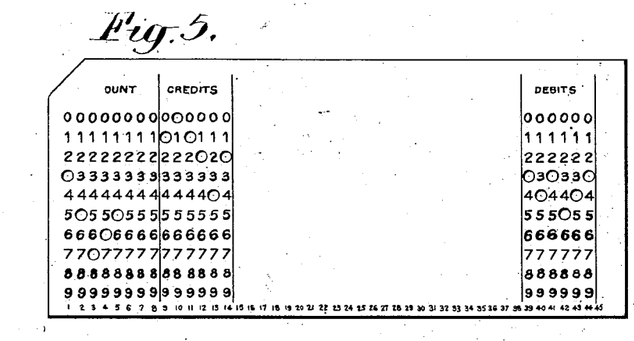
Fig. 5 is a typical record card showing three punched fields.
Figure 6:
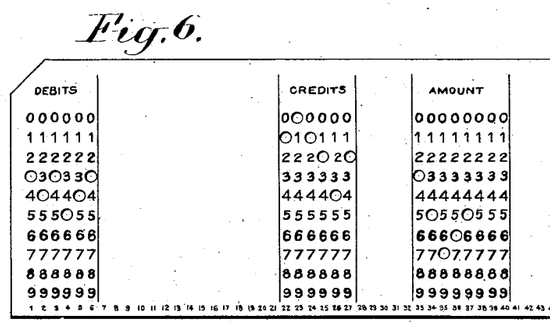
Fig. 6 is a duplicate of the card in Fig. 5 but with the fields transposed.

In operation the operator plugs from any brush socket 226 to any magnet socket 224, so it will be plain that any column on the original cards may be duplicated in any desired position on the duplicate card, thereby readily providing for any such transposition of data fields as is shown in the illustrative cards of Figs. 5 and 6. It will be noted that the field originally occupying columns 1 to 8 in the original card (Fig. 5) has been transposed to occupy columns 33 to 40 on the duplicate card, while columns 9 to 14 and 39 to 44 of the original are transposed to columns 22 to 27 and 1 to 6 respectively. Also, the multiple brush sockets 226 permit any single column on the original card to be duplicated in more than one position simultaneously on the duplicate card. Any original columns not desired to be duplicated are simply left unconnected at the switchboard and they will not be duplicated.

Figure 13:
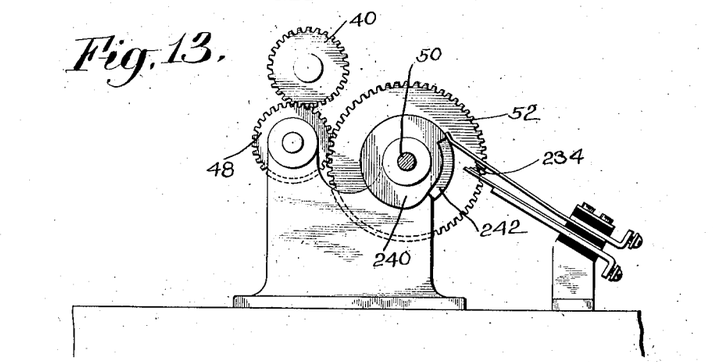
Fig. 13 is a detail of cams and contact devices.

The path of the current through brushes and magnets is as follows—from left side of line 194, through wire 228, switch 230, common bar 220, magnet 160, socket 224, any socket 226, brush 56, common bar 222, wire 232, make and break contacts 234 and 236 and wire 238 to right side of line. Contacts 234 and 236 are operated by cams 240 and 242 respectively, which are mounted on shaft 50 (Figs. 4, 7 and 13).

Figure 1:
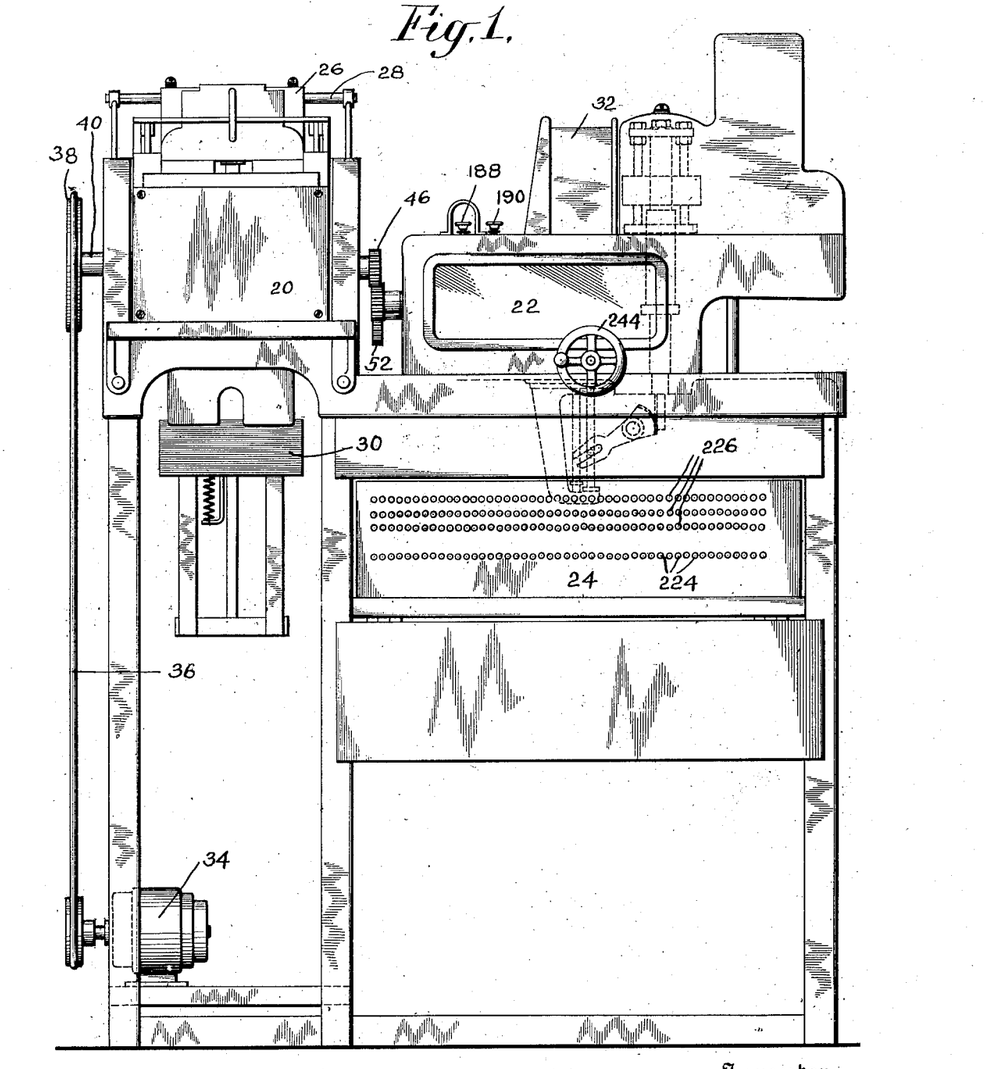
Fig. 1 is a side elevation view of the machine.

The hand wheel 244 (Fig. 1) is used to operate the mechanism shown in dotted lines to separate the dies in case a card gets jammed therein.

In accordance with the provisions of the patent statutes, I have herein described the principle of operation of my invention, together with the apparatus which I now consider to represent the best embodiments thereof, but I desire to have it understood that the apparatus disclosed is only illustrative and that the invention can be carried out by other means. Also, while it is designed to use the various features and elements in the combinations and relations described, some of these may be altered and others omitted and some of the features of each modification may be embodied in the others without interfering with the more general results outlined, and the invention extends to such use.

What I claim is:—

1. In a machine for perforating tabulating cards, in combination, means for feeding perforated record cards, a device for analyzing a perforated record card while the card is moving past said device, a receiver for holding cards in stack form, means for ejecting a perforated card after analysis thereof to the receiver, and means controlled by said device for duplicating in another card the perforations in the analyzed card.

2. In a record controlled punching machine for perforating tabulating cards, in combination, means for analyzing the perforations in an index column of a record card while the card is moving past said analyzing means, means controlled by said analyzing means for duplicating the perforation in an index column of another record card, and adjustable connections between said duplicating means and analyzing means to adjustably select the card column in which the perforation is to be duplicated.

3. In combination, a magazine for holding a stack of perforated cards, picker means for feeding the cards one by one from the magazine, means for analyzing the cards while in motion, means for ejecting the analyzed card, and means controlled by the analyzing means for perforating other records.

4. In combination, devices for analyzing a control card bearing control designations while the card is in motion, punching means selected for operation under control of said analyzing devices, and means for operating the selected punches after the analysis of the control card is completed.

5. A punching machine controlled by pattern cards comprising in combination, an analyzing device, means to feed pattern cards through said analyzing device, punching mechanism including selectable punches, means including electric circuits controlled by said analyzing device for selecting punches while a card is being fed through said analyzing device, means for subsequently actuating said punching mechanism a driving motor for the machine and card actuated means to keep the motor running during the punch selecting and subsequent punching operations.

6. In a machine of the class described, in combination, electric analyzing devices, a plurality of punches, a plurality of punch selector bars, each cooperating with a plurality of punches, and a controlling magnet for each selector bar, said magnets being controlled by said analyzing devices.

7. In a card punching machine of the class described, in combination, electric devices for analyzing pattern cards having index positions in columns, a punch corresponding to each index position in the pattern card, a punch selector bar corresponding to each card column, means for moving said selector bars, and magnetic means for interrupting the movement of said bars, said interrupting means being controlled by said analyzing devices.

8. In a machine of the class described, in combination, an electric analyzing device, feeding mechanism to pass a pattern card through said analyzing device, punching devices comprising a plurality of punches, a plurality of punch selector members, means to move said punch selector members in synchronism with the passage of the pattern card through said analyzing device, and magnetic means controlled by said analyzing device to interrupt the selector members in positions to render effective punches corresponding to the perforations in the pattern card.

9. The invention set forth in claim 8 in which means is provided to subsequently actuate said punching devices.

10. A punching machine comprising a row of punches and a common selector member therefor, means for effecting relative movement between said punches and said member and controlling means comprising mechanism for translating punch designations into time differential equivalents and mechanism for interrupting the relative movement in accordance with the differential equivalents to select corresponding punches.

11. In a record controlled punching machine, analyzing mechanism for analyzing controlling records while they are in motion, a plurality of punches, means controlled by said analyzing mechanism for selecting said punches successively for punching during an analyzing operation and means for operating the selected punches simultaneously subsequently to the analyzing operation.

12. In a record controlled punching machine, analyzing mechanism for analyzing moving records bearing differentially located index points, a plurality of punches, means controlled by said analyzing mechanism for selecting the punches successively in accordance with the differential location of index points and means for operating the selected punches simultaneously subsequently to the analyzing operation.

13. In a record controlled punching machine, analyzing mechanism for analyzing records while moving past said mechanism bearing differentially located index points in a plurality of record columns, a row of punches for each record column, each row containing a punch for each differential location of index points, means controlled by said analyzing mechanism for selecting the punches in all record columns successively according to the differential locations of index points in the several columns and means for operating the selected punches simultaneously subsequently to the analyzing operation.

14. A punching machine including a plurality of punches and a common selecting member therefor with means for moving it successively through positions for selecting said punches and controlling means including mechanism concurrently movable with said selecting member for selectively arresting it in any of its selecting positions.

15. A punching machine including a plurality of punches and a common selecting member therefor, means for effecting relative movement between said punches and said member to successively coordinate it with the punches for selecting different punches and controlling means for arresting the motion in the several coordinated positions, said means including mechanism movable to a plurality of different controlling positions corresponding to the different coordinated positions of the punches and selecting member and means coacting with said mechanism for selecting its control positions.

16. A punching machine including a plurality of rows of punches with a common selecting member for each row, means for successively moving said selecting members through successive positions for selecting the punches and controlling means including mechanism concurrently movable with said selecting members and devices coacting therewith for independently and selectively arresting each selecting member in any one of its several positions.

17. A punching machine including a plurality of rows of punches with a common selecting member for each row, means for effecting relative movement between said punches and said member to successively coordinate them for selecting the different punches and controlling means for independently and selectively arresting the relative movement between each row of punches and its selecting member in any one of the several coordinated positions, said means including mechanism movable to a plurality of different controlling positions corresponding to the different coordinated positions of the punches and selecting members and means coacting with said mechanism for selecting its control positions.

18. In a record controlled punching machine, analyzing mechanism for analyzing moving records and including controlling means operative in response to differentially located index points on the records, record feeding means for feeding each record through the analyzing mechanism with an uninterrupted movement, a plurality of punches corresponding to different index points on the records and a common selecting member for said punches, means for effecting relative movement between said punches and said selecting member through successive coordinated punch selecting positions, and means controlled by said controlling means for arresting the relative movement in positions corresponding to the differentially located index points.

19. In a record controlled punching machine, analyzing mechanism for analyzing moving records and including controlling means operative in response to differentially located index points on the records, record feeding means for feeding each record through the analyzing mechanism with an uninterrupted movement, a plurality of punches corresponding to different index points on the records and a common selecting member for said punches, means for moving said selecting member to selecting positions for the several punches and means controlled by said controlling means for arresting the selecting member in positions corresponding to the differentially located index points.

20. In a machine for operating on tabulating record cards bearing index point designations, picker means for feeding individual records, electrical analyzing means for reading said cards while in motion past said means, and means for duplicating said designations on other individual tabulating cards in accordance with the analysis.

21. In a machine for operating on record cards bearing a plurality of index point positions, any of which may contain an index point designation, electrical means for analyzing the index point positions of record cards successively while the cards are in motion, means for ejecting aforesaid cards after the analysis, a receiver for receiving the ejected cards in stack form, and means controlled by said analyzing means for setting index points on other record cards in accordance with the analysis.

22. In combination, means for analyzing data in record columns while the record is in motion, duplicating means for operating in columns of another record, an electrical control device for said duplicating means including adjustable control connections from said analyzing means to said device to adjustably select the columns of said other record in which the duplicating means is to operate.

23. In combination, means for successively analyzing the designations of a record, a plurality of rows of punches, means for feeding individual blank cards to said punches, means controlled by said analyzing means for selecting certain of the punches for operation on a blank card, and means for ejecting the latter card from the gang punch after any single punching operation on the latter card.

24. In combination, a card magazine, means for analyzing a pattern card while the latter is in motion, means for intermittently feeding pattern cards from said magazine to the analyzing means, perforating means, and means controlled by the analyzing means for operating the perforating means in accordance with the analyses of a pattern card.

25. In combination, means for continuously feeding pattern cards, picker means for delivering the pattern cards to said feeding means at intervals, means for analyzing a pattern card while in motion, and perforating means controlled by said analyzing means.

26. In a machine of the class described, in combination, means for intermittently feeding record cards, a device for analyzing said cards while they are in continuous motion, and duplicating means controlled by said device in accordance with the analyses of the record cards.

27. In a machine of the class described, means for feeding control cards at intervals, an analyzing device for reading said cards while they are in motion past said analyzing means, and means controlled by said device for operation at intervals alternating with said control card feeding intervals for punching other record cards in accordance with the analyses.

28. In a machine of the class described, means for successively reading data on record cards and means controlled by said reading means for punching record cards during the interval between analyzing operations in accordance with the analysis of the record cards.

29. In a punching machine, a punching die assembly, means for presenting cards thereto and removing them therefrom, said punching die having punches in columns, punch selectors one for each column of punches serving as combined punch selecting and actuating means, means for advancing the selectors successively into cooperation with the several punches of the rows, electrical means to differentially pick up electrical impulses and electromagnetic means controlled thereby for determining the differential selecting positions of the punch selectors, and means coordinating the time of action of the pick up means and the time of advance of the selectors and means coordinating the time of a punching action of the die with the feeding of the card into the die, the analyzing operation and the setting of the selectors.

30. In a card punching mechanism including in combination with a gang die, means for feeding cards one at a time into and out of the die, a plurality of rows of punches in said die, differentially movable punch selectors cooperating with the punches, one selector being provided for each row of punches, electromagnets for controlling the position of the selectors with respect to the punches, means for concurrently moving all the selectors, and means for energizing said electromagnets at differential times which times are coordinated to the displaced position of the selectors so that the selectors will represent by their position the amount to be punched.

31. In a card punching mechanism including in combination with a gang die means for feeding cards one at a time into and out of the die, a plurality of rows of punches in said die and differential movable punch selectors cooperating with said punches one selector being provided for each row of punches, a series of electromagnets one for each selector, and means for moving the selectors in unison and means coordinated in time of action with the unison movement of the selectors for imparting to the magnets controlling differentially timed current impulses whereby the selectors may be differentially positioned in accordance with the timing of the impulses to control punching operations.

32. In a card punching machine having a gang die to receive a tabulating card, a plurality of rows of punches in said die for punching said card at the index points, a plurality of selectors adapted to be positioned to represent an amount to be punched in the card, means for moving the selectors, means for electromagnetically controlling suspension of movement of the selectors, said electromagnetic means being under the control of differentially timed current impulses which by their timing represent the amount to be punched.

33. The invention set forth in claim 32 in which selective electrical connections are provided for selectively determining which of the magnets shall receive the timed impulses.

34. The invention set forth in claim 32 in which a source of timed impulses is provided and in which means is provided for selectively coupling said source of impulses with the controlling electromagnets.

In testimony whereof I hereto affix my signature.

JAMES W. BRYCE.